Sept. 12, 1944.  O. W. WINTER  2,358,197
TRIMMER FOR CHAIN WELDING MACHINES
Filed Dec. 3, 1941   2 Sheets-Sheet 1

INVENTOR
Otto W. Winter,
BY
Beau, Brooks, Buckley & Beau.
ATTORNEYS

Sept. 12, 1944.  O. W. WINTER  2,358,197
TRIMMER FOR CHAIN WELDING MACHINES
Filed Dec. 3, 1941  2 Sheets-Sheet 2
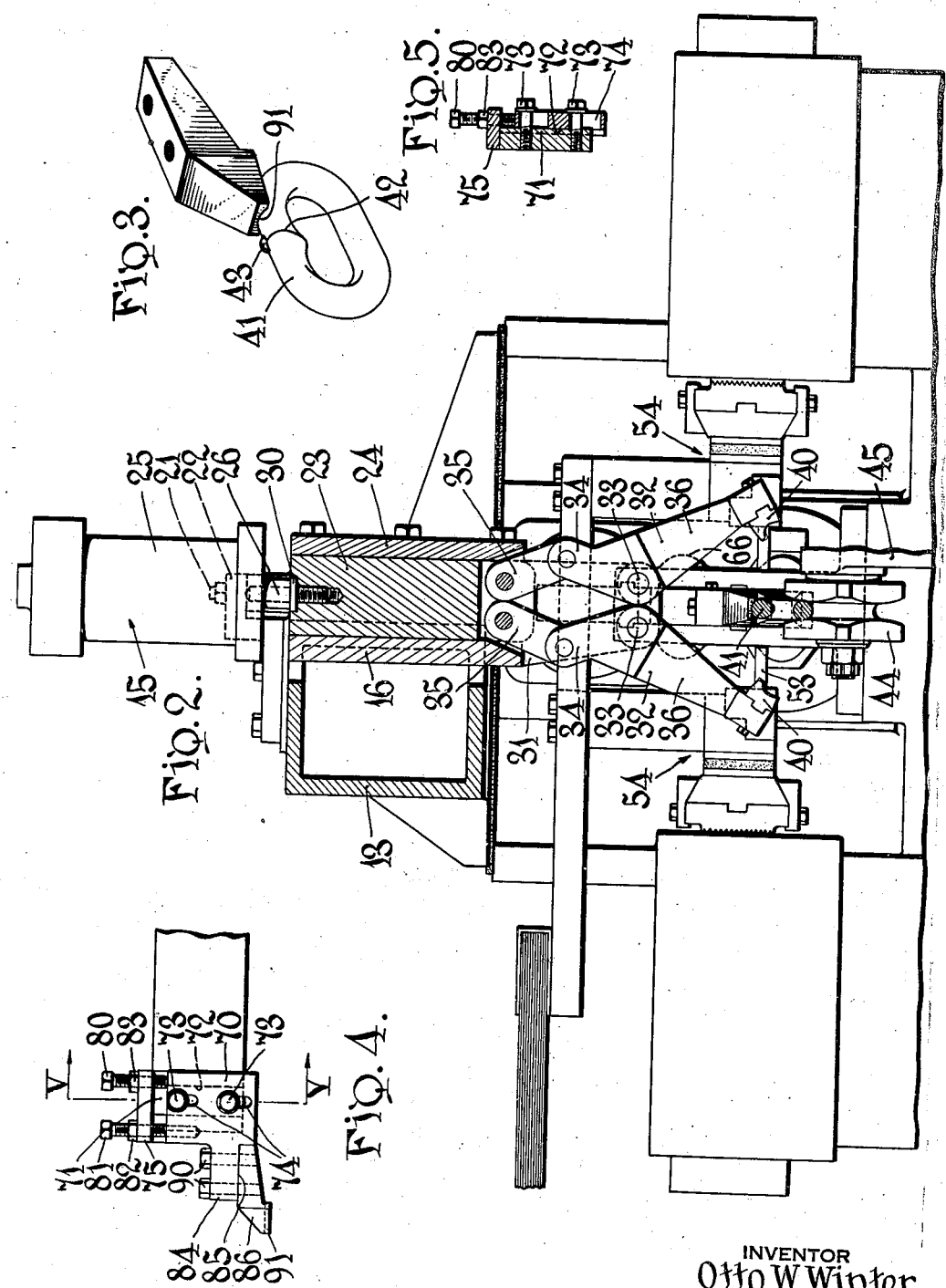
INVENTOR
Otto W. Winter,
BY
Beau, Brooks, Buckley & Beau.
ATTORNEYS Patented Sept. 12, 1944

2,358,197

UNITED STATES PATENT OFFICE 2,358,197

TRIMMER FOR CHAIN WELDING MACHINES

Otto W. Winter, Grand Island, N. Y., assignor to Columbus McKinnon Chain Corporation, Tonawanda, N. Y., a corporation of New York Application December 3, 1941, Serial No. 421,480

7 Claims. (Cl. 59—29)

My invention relates in general to trimmers for chain welding machines, and particularly to a shearing mechanism for shearing off surplus metal at the exterior surface of a chain link at the weld.

The principal object of my invention has been to provide a shearing mechanism which shall remove from the welded link at the joint any protuberance resulting from the welding or subsequent swaging operation.

Another object has been to provide such a shearing tool which may be pneumatically operated.

A further object has been to provide a tool so mounted that it may be accurately adjusted to the diameter of the link being welded or adjusted for various sized links.

Moreover, my shearing device quickly removes substantially all surplus metal resulting from the welding from the exterior of the link at a radius equal substantially to and level with the diameter of the stock forming the link, thus making a substantially smooth exterior surface on the link at the weld.

The above objects and advantages have been accomplished by the device shown in the accompanying drawings, of which:

Fig. 2 is a side section elevation of the machine taken on line II—II of Fig. 1;

Fig. 3 is an enlarged, perspective view showing the shearing tool in position for operation;

Fig. 4 is an enlarged, side elevation of the shearing tool mounting; and,

Fig. 5 is an enlarged, sectional view taken on line V—V of Fig. 4.

Figure 1:
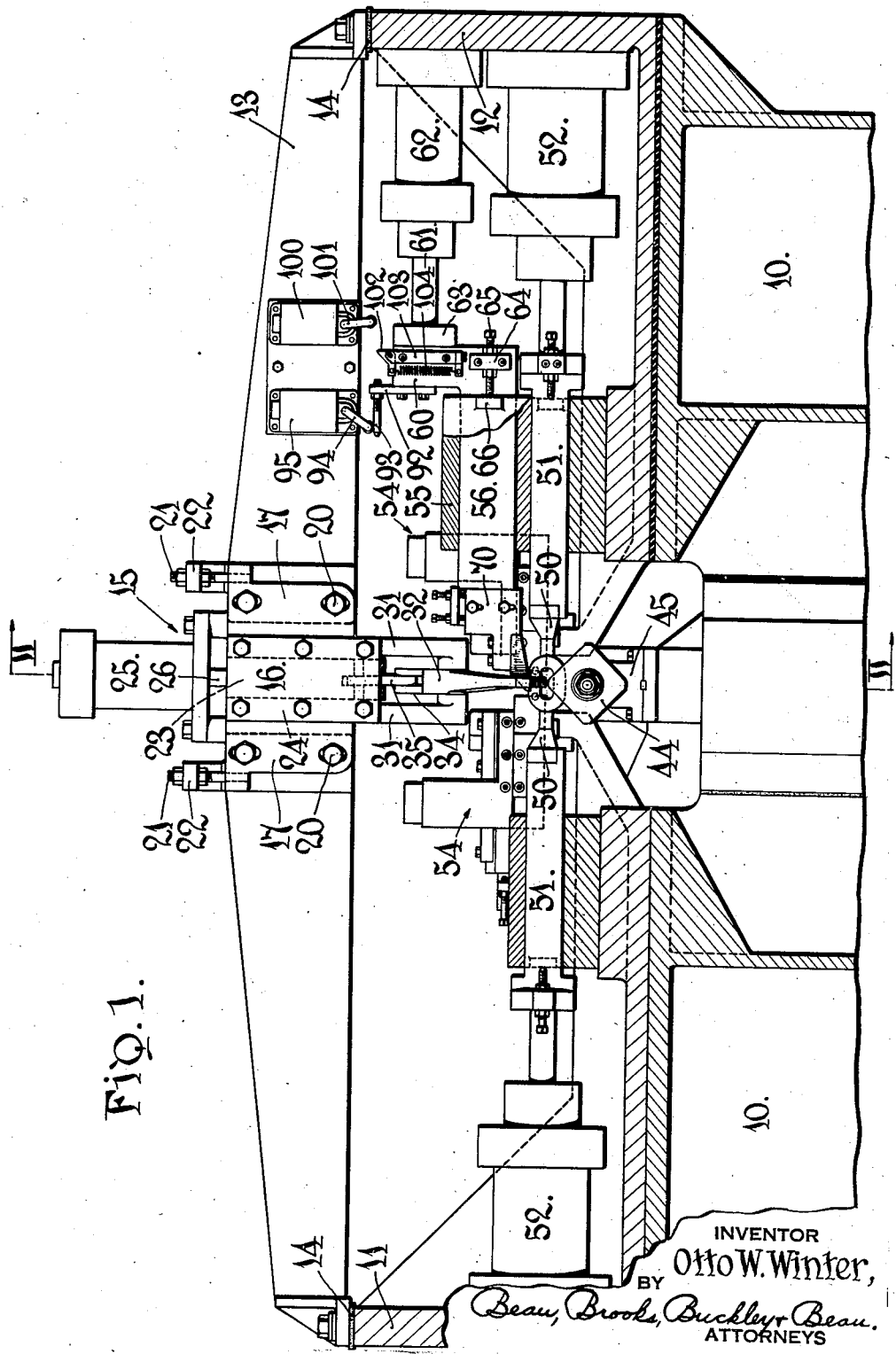
Fig. 1 is a front elevation of a welding machine showing my invention applied thereto.

In the drawings, 10 represents the base of the chain welding machine to which my invention is applied. This base is preferably provided at each side with upstanding flange members 11 and 12 which support a swage bracket 13. This bracket extends across the machine from one flange member to the other and is insulated from the flange members and the base by means of suitable insulating strips 14, arranged under each end of the bracket. The bracket is secured in place upon the members by suitable fastening means.

The bracket supports a swaging device 15 at a point preferably midway its length. This swaging device, which is the subject matter of another application, comprises a swaging guide 16 which is secured to the face of the swage bracket 13 and which is formed with outwardly extending flanges 17 having slotted openings 20 formed therein, whereby vertical adjustment of the bracket may be had. Swage guide adjusting screws 21 are carried by adjusting brackets 22 whereby the position of the guide may be accurately adjusted. The guide carries a toggle link block 23 in slidable manner and the same is held in position within the guide by means of a guide cap 24. Mounted above the toggle link and supported by the swage bracket is the swage cylinder 25. The piston rod 26 of this cylinder is connected to the toggle link block by means of a connecting screw 30.

The swage guide 16 is provided with two downwardly extending toggle-supporting arms 31 which are interspaced and between which are pivotally mounted the swage arms 32. These arms are mounted upon swage arm bolts 33 which are mounted in the toggle-supporting arms 31. The upper legs 34 of the swage arms are connected to the link block by means of toggle links 35 whereby reciprocal movement of the block will cause the lower legs 36 of the swage arms to be forced toward and away from each other. The lower legs of the swage arms each carry a swaging anvil 40 which is brought to bear upon opposite sides of the link 41 producing the swaging action thereon at the joint 42 and producing the tab 43 shown in Fig. 3.

The link 41 is suspended by and fed to the machine by means of the feed wheel 44. This wheel is mounted upon a suitable shaft, not shown, and rotatably supported by a bracket 45. Since this wheel and its operating means does not form a part of this invention, it is not further shown or described. While I have shown but one link, it is obvious that a continuous chain is fed through the machine in the process of welding.

The link 41, and other links acted upon by the machine, is held in position and upset, as the welding current is applied, by means of upset tools 50 carried by upset bars 51. These upset bars are operated by means of hydraulic upset cylinders 52.

The welding electrodes 53 of the welding machine are shown in their retracted positions and are carried by electrode holder mechanisms 54 which are operated in proper sequence with the swaging anvils by means well known to those skilled in the art. Since the mechanisms holding and operating the electrodes do not form a part of this application, they are not further shown or described.

Arranged at one side of the machine is a shear and upset guide bracket 55 which slidably supports the upset bar 51 at that side of the machine and also slidably supports the shear bar 56. This shear bar is provided with an upstanding end 60 which is secured to the piston rod 61 of the shear cylinder 62 by means of a connector 63. A stop 64 is provided at the end of the shear bar and carries an adjusting screw 65 which bears against a stop lug 66 carried by the guide bracket 55 when the bar has traveled forwardly the predetermined distance.

The forward end of the shear bar carries a shear tool holder 70 which is attached to the bar in slidable manner by the provision of a ridge 71 carried by the bar and a coacting groove 72 formed in the holder. The holder is secured to the bar by means of screws 73 which pass through adjusting slots 74 formed in the holder. An adjusting plate 75 is secured to the top of the shear bar and is preferably projected over the upper edge of the shear tool holder 70. This plate carries an adjusting screw 80 and a lock screw 81. The adjusting screw is screwthreaded into the plate and has its lower end in contact with the upper surface of the tool holder, whereby the holder may be forced downwardly. The lock screw 81 is screwthreaded into the holder, passing through an aperture formed in the plate. An adjusting nut 82 is carried by the lock screw 81 and by it the holder may be elevated. A lock nut 83 is carried by the adjusting screw, whereby it may be locked in its adjusted position.

The shear tool holder 70 is formed with a forwardly extending arm 84 which has a recess 85 on its under surface within which is disposed the shear tool 86. This tool is secured in place by means of bolts 90. The tool is provided with a cutting edge 91 which is of curved formation to correspond to the curvature of the stock forming the link 41.

Carried by the upstanding arms 60 of the shear bar is a shear switch plate 92 which supports a shear switch pin 93. This pin serves to contact the arm 94 of the shear switch 95 when the shear bar has traveled forwardly the predetermined distance. The shear pin is adjustably secured to the plate 92 so that the parts may be accurately adjusted. The shear switch 95 is carried by the swage bracket 13. Another switch 100 having an arm 101 is also carried by the swage bracket and is in the path of the trip dog 102 on the return stroke of the shear bar 56. This trip dog is pivotally carried by a trip dog holder 103 secured to the arm 60 of the shear bar. This trip dog is controlled by means of a spring 104 which causes the dog to be held normally in the position shown in Fig. 1. When the arm is being moved forwardly, the dog will rotate and slide under the arm 101 of the switch without causing the same to be moved, but when the arm is returned from the position shown in Fig. 1 the dog will cause the arm 101 of the switch to be actuated. This switch serves to control other parts of the welding machine and these switches together with the well known solenoid-operated valves control the supply of fluid to the various cylinders to bring about the desired results. Since the switches and solenoid-operated valves together with the specific type of cylinder are standard articles of manufacture they are not therefore further shown or described.

From the foregoing it will be obvious that when the shear bar is operated forwardly to the position shown in Fig. 1, the shear tool will be carried across the top of the link 41 and the tab 43 will be quickly sheared from the link in such manner as to provide a substantially smooth surface.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

What is claimed is:

1. In a chain welding machine, the combination with the upset bars thereof, of a shearing mechanism comprising a shearing tool having a cutting edge shaped to conform substantially to the exterior surface of the link, a slidably mounted shear bar, means for adjustably connecting the shear tool to the shear bar, comprising a tool holder carried at the forward end of said shear bar for vertical adjustment, means for clamping said holder to said bar, and means for adjusting and locking said holder, and hydraulic means connected to said shear bar for causing a rapid forward movement of said tool to shear the tab resulting from the welding from the outer surface of the welded side of the link while said link is being held between the upset bars of the machine.

2. In a chain welding machine, the combination with the upset bars thereof, of a shearing mechanism comprising a shearing tool having a cutting edge shaped to conform substantially to the exterior surface of the link and to engage the welding tab on the link while said link is being held by the upset bars, a slidably mounted shear bar, a hydraulic cylinder located above said bar, an upstanding arm carried by said shear bar and engageable with said cylinder for operation thereby, and means connecting said arm and said cylinder.

3. In a chain welding machine, the combination with the upset bars thereof, of a shearing mechanism comprising a reciprocating shear bar, a shear tool, a vertically adjustable shear tool holder connecting said tool to said shear bar and operable upon the link when said link is being held between said upset bars, positive means carried by said shear bar for adjusting said holder relatively therewith, and means for locking said holder in its adjusted position.

4. In a chain welding machine, the combination with the upset bars thereof, of a shearing mechanism comprising a reciprocating shear bar having an adjusting plate, a shear tool, a vertically adjustable shear tool holder connecting said tool to said shear bar and operable upon the link when said link is being held between said upset bars, screw means carried by said shear bar and said plate for permitting positive adjustment of said holder in either direction, and means for locking said holder in its adjusted position.

5. A chain welding machine, a support engageable against the unbroken sides of chain links, other means engageable against the ends of such links to move the ends toward each other for completing a welded joint in each, shearing means engageable against the outer surface of the welded side of said link and movable longitudinally therealong to shear off a portion of the tab left by welding, such shearing being accomplished with the opposite side of the link in abutment with said support, whereby clean shearing and accurate over-all size of the links is assured.

6. A chain welding machine, a support engageable against the unbroken sides of chain links, other means engageable against the ends of such links to move the ends toward each other for completing a welded joint in each, shearing means engageable against the outer surface of the welded side of said link comprising a reciprocating shear bar movable longitudinally of said link, and a shear tool secured to said bar to shear off a portion of the tab left by welding, such shearing being accomplished with the opposite side of the link in abutment with said support, whereby clean shearing and accurate over-all size of the links is assured.

7. A chain welding machine, a support engageable against the unbroken sides of chain links, other means engageable against the ends of such links to move the ends toward each other for completing a welded joint in each, shearing means engageable against the outer surface of the welded side of said link comprising a reciprocating shear bar movable longitudinally of said link, a shear tool holder mounted on said bar for vertical adjustment therewith, means for securing said holder in its adjusted position, and a shear tool carried by said holder for shearing off a portion of the tab left by welding, such shearing being accomplished with the opposite side of the link in abutment with said support whereby clean shearing and accurate over-all size of the links is assured.

OTTO W. WINTER.